United States Patent [19]
Hyakumura

[11] 3,771,622
[45] Nov. 13, 1973

[54] DEVICE FOR LUBRICATING A TANDEM AXLE ASSEMBLY WITH AN INTERAXLE DIFFERENTIAL

[76] Inventor: Hiroyuki Hyakumura, Yokohama, Japan

[22] Filed: Mar. 30, 1972

[21] Appl. No.: 239,613

[30] Foreign Application Priority Data
Mar. 31, 1971 Japan.............................. 46/23427
Mar. 31, 1971 Japan.............................. 46/23428
Mar. 31, 1971 Japan.............................. 46/23429

[52] U.S. Cl. .................... 184/11 A, 180/24.09
[51] Int. Cl. ............................................. F16n 7/16
[58] Field of Search ............. 184/11 R, 11 A, 6.12; 180/24.09, 13 A, 13 R; 74/710.5, 711

[56] References Cited
UNITED STATES PATENTS
| | | | |
|---|---|---|---|
| 2,870,854 | 1/1959 | Keese.............. | 180/24.09 |
| 2,309,162 | 1/1943 | Buckendale........ | 184/11 R X |
| 3,383,937 | 5/1968 | Toenne et al...... | 184/11 R X |
| 3,618,711 | 11/1971 | Vollmer........... | 184/11 A X |
| 3,532,183 | 10/1970 | Shealy............ | 184/13 R X |

FOREIGN PATENTS OR APPLICATIONS
1,447,322  6/1966  France.............................. 184/6.12
1,047,820  12/1958  Germany........................... 184/6.12

Primary Examiner—Manuel A. Antonakas
Attorney—Richard C. Sughrue et al.

[57] ABSTRACT

In a forward axle assembly of a tandem axle assembly including a carrier mounted to an axle housing which has a first chamber formed therein, a gear housing mounted on the carrier and forming a second chamber therebetween, a differential case mounted on the gear housing and forming a third chamber therebetween, an interaxle differential disposed in the third chamber for carrying and distributing the torque from an engine, transfer gears being disposed in the second chamber and operatively connected between the interaxle differential and the carrier, a ring and pinion gear assembly meshed with each other and disposed in the first chamber, the pinion gear being connected to one of the transfer gears, a lubricating device for the interaxle differential, the lubricating device comprising a lubricating oil passage for conducting the lubricating oil directly from the ring gear in the axle housing to the interaxle differential in the third chamber.

5 Claims, 6 Drawing Figures

DEVICE FOR LUBRICATING A TANDEM AXLE ASSEMBLY WITH AN INTERAXLE DIFFERENTIAL

BACKGROUND OF THE INVENTION

1. Field of the Invention

This invention relates to a forward axle assembly of a tandem axle assembly including an interaxle differential, and more particularly to a lubricating device for the interaxle differential or power divider in the forward axle assembly.

2. Description of the Prior Art

In a conventional tandem axle assembly, such as that disclosed, for example, in U.S. Pat. No. 2,870,854, the tandem axle assembly is located beneath the rear of a vehicle chassis and is equipped with a bevel gear interaxle differential mounted on the forward tandem drive axle assembly. The forward drive axle assembly and rearward drive axle assembly are positioned relatively close to each other and constitute a tandem drive axle assembly. Each of the axle assemblies are connected to the vehicle chassis by the usual suspension means. In the forward drive axle assembly, an interaxle differential housing is secured to an annular flange on the front of the carrier housing and includes a rear section that houses the transfer gearing between the interaxle differential and the carrier. During rotation of the ring gear, the forward axle ring gear throws oil into a trough which conducts the oil to a passage in intermediate idler gear shaft, and thence through this passage to the bearings. A hole is formed at one end of the trough and mates with an aligned hole in the interaxle differential rear housing section to permit part of the oil in the trough to run into the bottom of the rear housing section. This oil is picked up by the transfer gears and thrown into a longitudinal side trough integrally formed in the upper portion of the rear housing section. The upper trough is inclined forward and downward to divert oil through an opening in the wall into the interaxle differential chamber between the housing sections.

Several relatively large diameter oil holes are formed in the forward member of the interaxle differential cage to lubricate the interaxle differential gears. Excess oil from the interaxle differential housing flows back into the rear section and then passes through the pinion shaft bearings into the axle housing. In such a structure, the oil passes through various intermediate means and paths from the ring gear chambers to the interaxle differential housing, thus resulting in a waste of the oil along the path of travel. Furthermore, the structure of the oil passage is complicated and costly to manufacture.

SUMMARY OF THE INVENTION

It is, therefore, an object of this invention to provide a new and simple lubricating device for a tandem axle assembly to increase an amount of lubricating oil fed into an interaxle differential housing of the assembly.

It is another object of this invention to provide a device for lubricating a tandem axle assembly having a lubricating oil passage directly connected from an axle housing to the interaxle differential housing to directly introduce lubricating oil from the axle housing to the interaxle differential housing.

It is still another object of this invention to provide a device for lubricating a tandem axle assembly with an interaxle differential which is simple in structure.

A further object of this invention is to provide a lubricating oil passage continuously connected from the axle carrier housing directly to the interaxle differential housing and formed at an upper portion of the housings for directly introducing the lubricating oil contained in the axle housing into the interaxle differential housing.

A still further object of this invention is to provide a part of the lubricating oil passage at the upper portion of the gear housing and formed in a trough shape for easily gathering the lubricating oil discharged from the transfer gear in the trough whereby the oil supply amount is further increased together with the oil fed from the axle ring gear.

It is still another object of this invention to provide an additional lubricating oil passage for receiving the lubricating oil discharged into the transfer gear housing and introducing it into the interaxle differential housing at the upper side of another side of the gear housing for effectively utilizing the lubricating oil discharged from both of the ring gear housing and the transfer gear housing, in addition to the first lubricating oil passage.

These and other objects, features and advantages of this invention will become apparent from the following description taken in conjunction with the accompanying drawings:

DESCRIPTION OF THE PREFERRED EMBODIMENTS

Figure 1:
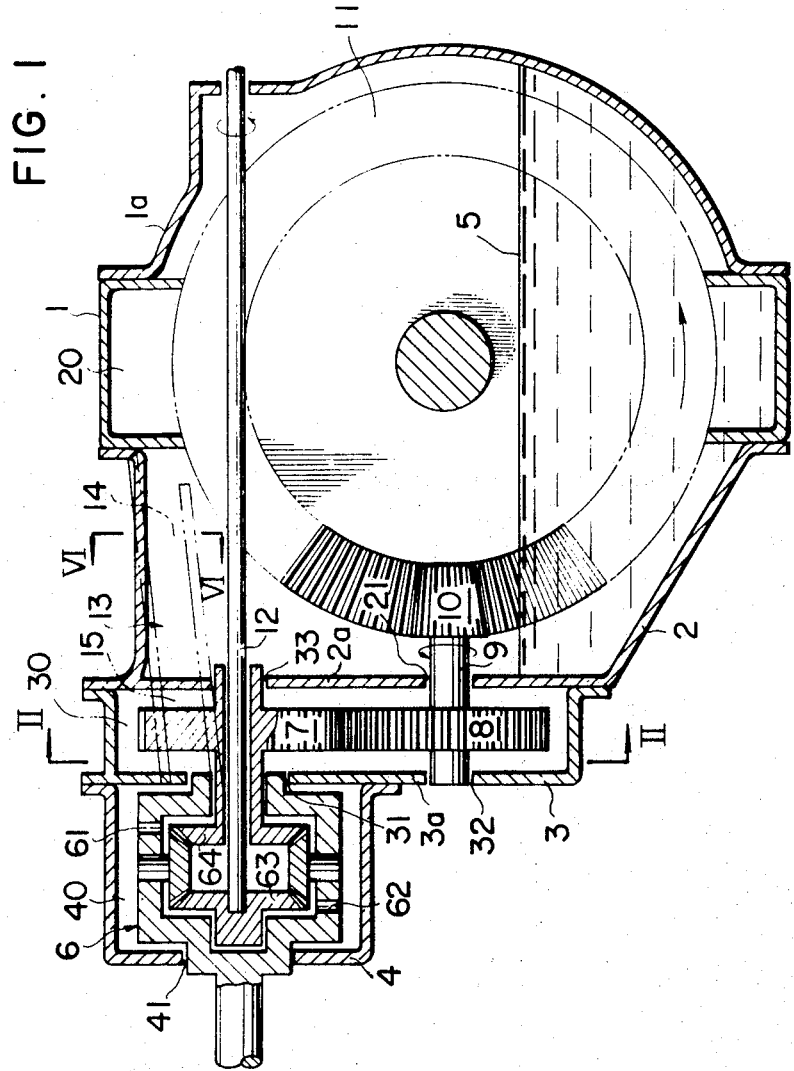
FIG. 1 is a schematic longitudinal sectional view of the front axle assembly of a tandem axle assembly, provided with one embodiment of a device for lubricating the axle assembly therein constructed according to this invention.

Referring now to the drawings, particularly to FIG. 1, which shows a sectional view of the front axle assembly of a tandem axle assembly provided with one embodiment of a device for lubricating the tandem axle assembly therein constructed according to this invention, an axle housing 1 has a cover 1a fixed to the rear portion thereof. An axle carrier assembly 2 is mounted to the front portion of the housing 1, and a transfer gear housing 3 is mounted to the front portion of the carrier 2; a case 4 housing the interaxle differential is mounted to the front portion of the transfer gear housing 3.

A first chamber 20 is formed by the axle housing 1 and the carrier 2, and a second chamber 30 is formed by the carrier 2 and the gear housing 3; a third chamber 40 is formed by the gear housing 3 and the case 4. A wall 2a for forming a partition between the first and second chambers is provided on the carrier 2, while a second wall 3a forming a partition between the second and third chambers is provided on the gear housing 3.

An interaxle differential 6 for distributing the torque from an engine is supported in the third chamber 40 by bearings 31 and 41. Transfer gears 7 and 8 are supported in mesh with each other in the second chamber 30 by bearings 31, 33 and 21, 32, respectively. Transfer gear 8 is fixed to a pinion shaft 9 which is extended into the first chamber 20 and is connected to a pinion 10. Pinion 10 is meshed with a ring gear 11 for transmitting the torque to a wheel (not shown).

One of the output side gears 64 in the interaxle differential 6 is connected to transfer gear 7, and the other output side gear 63 is connected to a shaft 12 extended through the axle housing 1 and the gear 7. The shaft 12 is connected to a pinion (not shown) of the rear axle assembly. The torque of the engine is, therefore, transmitted to the front and rear axle assemblies of the tandem axle by the interaxle differential assembly 6.

Lubricating oil 5 is contained in the bottom of the first chamber 20, and part of the ring gear 11 is always immersed in the lubricating oil.

In the tandem axle structure of the present invention, one means for introducing lubricating oil into the interaxle differential is somewhat similar to that disclosed in U. S. Pat. No. 2,870,854. According to this structural feature, the lubricating oil in the first chamber 20 is conveyed by the ring gear 11 to a trough or passage formed in the carrier, and is then introduced into the second chamber 30. The lubricating oil accumulated in the second chamber 30 is thrown to a trough at the upper portion of the gear housing by the transfer gears, and is then introduced into the third chamber 40 to lubricate the interaxle differential assembly 6. The excessive oil in the third chamber 40 is returned through a proper escape hole provided in the wall 3a partitioning the chambers 30 and 40 into the chamber 30. The excessive oil in the chamber 30 is returned through the bearing 21 supporting the shaft 9 of the pinion 10 into the chamber 20.

As shown by the two-dot chain line in FIG. 1, a continuous lubricating oil passage 13 is provided at the upper portions of each of the three chambers 20, 30 and 40. The continuous passage 13 consists of a passage 14 formed at the upper portion of the carrier 2 and a passage 15 formed at the upper portion of the transfer gear housing 3.

Figure 6:
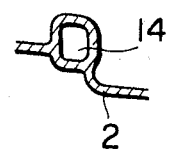
FIG. 6 is a sectional view of the lubricating oil passage taken along the line VI—VI in FIG. 1.

The cross sectional shape of the passage 14 is a box shape as shown in FIG. 6. One end of the passage 14 opens adjacent the path of rotation of the ring gear 11, while the other end thereof communicates with one end of the passage 15. The cross sectional shape of the passage 115 is a trough shape configuration, as shown in FIG. 2, with one end thereof communicating with one end of the passage 14 as previously described, while the other end thereof opens in the third chamber 40.

While the vehicle is running, that is, while the ring gear 11 is rotating, part of the lubricating oil adhering thereto is discharged into the open end of the passage 14. This lubricating oil flows through the passages 14 and 15 into the third chamber 40, having the interaxle differential 6 retained on the bottom thereof. Holes 61 and 62 are formed in the carrier of the interaxle differential 6, and the oil in the third chamber 40 flows into the interaxle differential 6 through the holes 61 and 62 to lubricate the elements therein requiring lubrication. The excess oil in the third chamber 40 flows through a hole (not shown) formed in the wall 3a between the second and third chambers 30 and 40 or the bearings 31 for supporting one end of the interaxle differential 6 into the second chamber 30 and is retained in the bottom thereof. The lubricating oil passing into the bottom of the second chamber 30 serves to lubricate the transfer gears 7 and 8. Since part of the gear 8 is always immersed in the lubricating oil retained on the bottom of the second chamber 30, they are lubricated by the rotation of the gears 7 and 8. The excess lubricating oil in the second chamber 30 returns into the first chamber 20 through the bearing 21 supporting the pinion shaft 9 or through a hole (not shown) formed in the wall 2a between the chambers 20 and 30.

Figure 2:
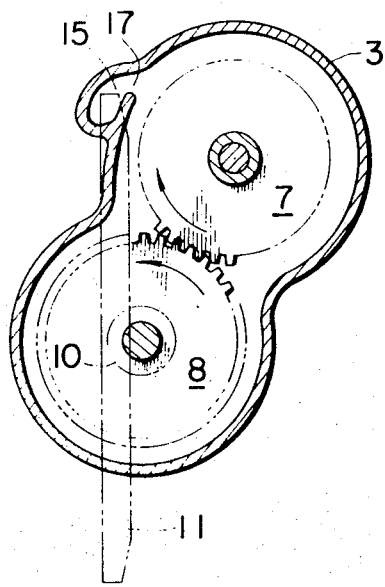
FIG. 2 is a sectional view of the transfer gear housing taken along the line II—II in FIG. 1.

The direction of rotation of the transfer gears 7 and 8 are shown by arrows in FIG. 2. The oil accumulated in the bottom of the chamber 30 is discharged by the gears into the upper portion of the chamber 30, i.e., the upper portion of the gear housing 3. Part of the oil flows into the trough 15 to increase the amount of lubricating oil fed into the interaxle differential 6.

Figure 3:
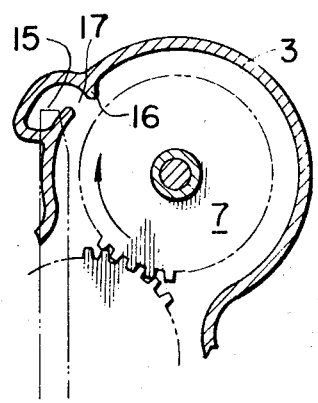
FIGS. 3 and 4 are partial sectional views of further embodiments of the transfer gear housing shown in FIG. 2.

In order to obtain a positive flow of the lubricating oil discharged from the transfer gear into the trough shaped passage 15, a projection 16 is formed at the open portion of the trough 15 of the upper portion of the slot 17 for receiving the oil, as seen in FIG. 3. Part of the lubricating oil discharged from the gear 7 is received by the projection 16 to positively flow into the trough 15.

Figure 4:
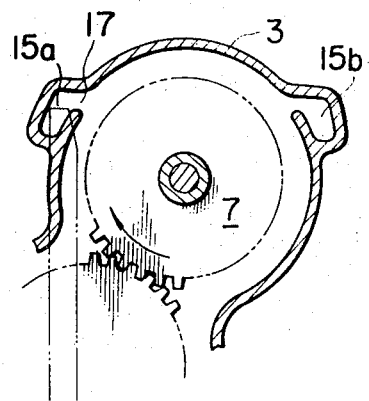

To further increase the amount of lubricating oil supplied into the interaxle differential 6, a second trough shaped passage 15b is formed on the side of the upper portion of the gear housing 3 opposite a first passage 15a, as shown in FIG. 4. Since the direction of rotation of the gear 7 is as shown by the arrow, most of the lubricating oil discharged therefrom is received by the passage 15b rather than the passage 15a in FIG. 4. The passage 15b is so constructed as to introduce the lubricating oil therein into the third chamber 40. Therefore, even if the one end of the passage 15b is blocked by the wall 2a, the other end is so formed as to open in the chamber 40. The passage 15a does not always have to have a trough shaped configuration because most of the lubricating oil discharged from the transfer gear 7 is received by the passage 15b to be fed into the third chamber 40.

Figure 5:
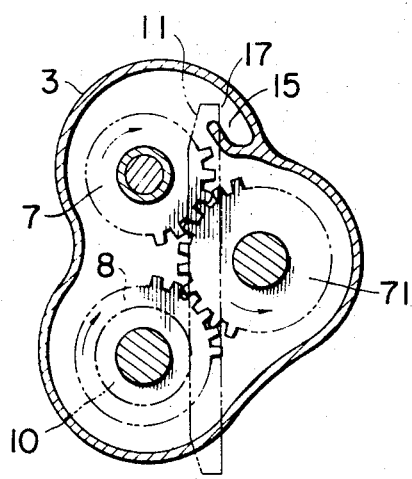
FIG. 5 is a sectional view of another embodiment of the transfer gear housing corresponding to FIG. 2.

In comparison with FIG. 2, the embodiment shown in FIG. 5 includes an intermediate idler gear 71 provided between the transfer gears 7 and 8. Accordingly, the ring gear 11 is disposed on the opposite side of the pinion 10 to obtain the same rotating direction as the ring gear 11 in FIG. 2. The embodiment of FIG. 5 incorporates the same lubricating structure and overall gearing mechanism as that shown in FIG. 1 and accordingly the representation and description of the structure corresponding to FIG. 1 is omitted here.

The following description of the embodiment of FIG. 5 will be made with reference to the details of FIG. 1 incorporated therein. In the tandem axle assembly of FIG. 5, the location of the passage 13 continuously formed between the chambers 20 and 40 is the same as that shown in FIG. 1. This passage 13 is formed at the upper portion of the carrier 2 and the gear housing 3 on the side opposite to that shown in FIG. 2. The passage is of trough shaped configuration. Since the slot 17 is so disposed as to face the rotating direction of the gear 7, the amount of the lubricating oil discharged from the gear 7 collected in the passage 15 is more than that of the embodiment shown in FIG. 2. This lubricating oil is discharged from the ring gear 11, and is fed into the chamber 40 together with the oil collected in the passage 14 so as to lubricate the interaxle differential 6. The cross sectional shape of the passage 14 is similar to that shown in FIG. 6.

In order to receive the oil discharged from the transfer gear 7, the cross sectional shape of the passage 15 shoule be of the trough shaped configuration having a slot 17 in the side thereof. In the embodiment shown in FIG. 2, the amount of lubricating oil flowing into the passage 15 is relatively less, so that cross sectional configuration may be of the shape shown in FIG. 6. The cross sectional shape of the passage 14 may be either as shown in FIG. 6 or as shown in FIG. 2. The passage 14 may be of any shape and disposition for receiving the lubricating oil from the ring gear 11 so as to introduce the oil into the passage 15.

In the embodiment shown in FIG. 2, the amount of lubricating oil flowing into the passage of the gear housing is reduced. Accordingly, if a second passage of trough shaped cross sectional configuration and having a slot facing the rotating direction of the transfer gear is formed at the upper side of the housing in addition to and opposite the first passage, as shown in FIG. 4, an oil supply volume similar to that of FIG. 5 may be obtained.

If the passage in the gear housing is formed as shown in FIGS. 4 and 5, the amount of lubricating oil supplied into the interaxle differential is increased so that the interaxle differential will be sufficiently lubricated, even during high load-low speed operation of the vehicle.

If the passage is formed with a trough shaped cross sectional configuration having a projection as shown in FIG. 3, the decreased amount of lubricating oil collected due to the rotating direction of the transfer gear will be supplemented.

It should be understood from the foregoing description that since the structure for lubricating a tandem axle assembly having an interaxle differential of the present invention includes a first lubricating oil passage continuously formed from a first chamber in the carrier housing to a second chamber at the upper portions of the carrier and the transfer gear housing to introduce the oil stored in the axle housing directly into the interaxle differential by the ring gear, the amount of lubricating oil supplied into the interaxle differential is greatly increased over the amount of oil supplied by the prior art structures. It should also be understood that when the passage provided at the top of the transfer gear housing is formd with a trough shaped configuration to receive the lubricating oil discharged from the transfer gear, the amount of oil supplied is further increased together with the oil fed from the ring gear. As discussed hereinabove, particularly, when a slot in the passage is so disposed as to face the rotating direction of the gear as shown in FIG. 5, the amount of oil supplied is increased by the amount of oil received from the ring gear, in comparison with the prior art devices.

Also, in every embodiment of the present invention, since the passage is integrally formed in the carrier and transfer gear housing, the structure is simple and easy to manufacture.

What is claimed is:

1. In a forward axle assembly of a tandem axle assembly, said forward axle assembly including a carrier mounted in an axle housing and forming a first chamber therebetween, a gear housing mounted on said carrier and forming a second chamber therebetween, a case mounted on said gear housing and forming a third chamber therebetween, an interaxle differential being disposed in said third chamber for distributing the torque from an engine, transfer gears being disposed in said second chamber and operatively connected between said interaxle differential and said carrier, said carrier including a pinion and ring gear meshed with each other and disposed in said first chamber, said pinion being connected with one of said transfer gears, and a lubricating device, the improvement characterized in that said lubricating device comprises a continuous lubricating oil passage means directly connected from said axle housing to said case housing said interaxle differential, said continuous lubricating oil passage means comprising a first continuous lubricating oil passage directly connected from said axle housing to said case housing said interaxle differential and being formed at the upper portions of said carrier housing through said gear housing, and a second continuous lubricating oil passage directly connected from said transfer gear housing to said interaxle differential housing and being formed on the side of said transfer gear housing opposite said first continuous lubricating oil passage.

2. In a forward axle assembly of a tandem axle, said forward axle assembly including a carrier mounted in an axle housing and forming a first chamber therebetween, a gear housing mounted on said carrier and forming a second chamber therebetween, a case mounted on said gear housing and forming a third chamber therebetween, an interaxle differential being disposed in said third chamber for distributing the torque from an engine, transfer gears being disposed in said second chamber and operatively connected between said interaxle differential and said carrier, said carrier including a pinion and ring gear meshed with each other and disposed in said first chamber, said pinion being connected with one of said transfer gears, and a lubricating device, the improvement characterized in that said lubricating device comprises a continuous lubricating passage means having a first passage formed at an upper portion of said carrier housing and having one end opening near the rotation path of the ring gear and the other end of said first passage connecting with a second passage at an upper portion of the gear housing, said second passage being formed at the upper portion of said gear housing and having one end communicating with the other end of said first passage and the other end of said second passage opening into the third chamber.

3. The improvement according to claim 2, wherein said second passage is formed with a slot-like opening in its inside wall for receiving lubricating oil dispersed from said transfer gears, whereby the amount of oil supplied to said interaxle differential is increased together with the oil fed from said ring gear.

4. The improvement according to claim 3, wherein said second passage includes a projection formed at the upper portion of said second passage and positioned above said slot-like opening for effectively receiving lubricating oil dispersed from said transfer gears, whereby the amount of lubricating oil supply to said interaxle differential is further increased together with the oil fed from said ring gear.

5. The improvement according to claim 2, further comprising a third continuous lubricating oil passage formed on the side opposite said second passage and directly connected from said transfer gear housing to said interaxle differential housing, said third continuous oil passage facing opposite the direction of rotation of one of said transfer gears.

* * * * *

UNITED STATES PATENT OFFICE
CERTIFICATE OF CORRECTION

Patent No. 3,771,622            Dated November 13, 1973

Inventor(s) Hiroyuki Hyakumura

It is certified that error appears in the above-identified patent and that said Letters Patent are hereby corrected as shown below:

Please insert the name and address of the assignee:

Isuzu Motors Ltd.

Tokyo, Japan

Signed and sealed this 25th day of June 1974.

(SEAL)
Attest:

EDWARD M. FLETCHER, JR.            C. MARSHALL DANN
Attesting Officer                     Commissioner of Patents